Patented June 26, 1951

2,558,549

UNITED STATES PATENT OFFICE 2,558,549

ESTERS OF 3,5,14,19-TETRAHYDROXY-ETIO-CHOLANIC ACID AND DERIVATIVES

Maximilian R. Ehrenstein, Philadelphia, Pa., assignor to the Trustees of the University of Pennsylvania, Philadelphia, Pa., a corporation of Pennsylvania No Drawing. Application July 14, 1950, Serial No. 173,953

6 Claims. (Cl. 260—397.1)

This invention relates to esters of certain 3,5,14,19-tetrahydroxy-etiochlolanic acids, as well as to esters of its 3,19-diacyl derivatives. More particularly, it concerns compounds having the structure:

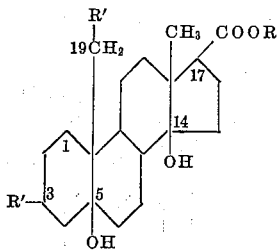

in which R' is selected from the group consisting of —OH and acyloxy derived from lower alkyl monohydric acids containing no other substituent groups, and R is selected from the group consisting of lower alkyl, phenyl and benzyl radicals.

The products of the invention are useful as intermediates in the preparation of other compounds, and some of them have certain therapeutic effectiveness.

The esters of 3,5,14,19-tetrahydroxy-etiocholanic acid are prepared by starting with the latter acid, the preparation of which is disclosed in application Serial No. 666,191, filed on April 30, 1946, of which the present application is a continuation in part. Reference may be had to that application, now Patent No. 2,518,672, for the preparation of this starting material.

The esters of the 3,19-diacyl derivatives of 3,5,14,19-tetrahydroxy-etiocholanic acid are prepared by starting with this latter diacyl compound which also is disclosed in my copending application Serial No. 666,191. The preparation of these starting materials is therefore not disclosed here.

The products of the present invention are illustrated by the following representative examples:

*Example I.—Methyl ester of 3,5,14,19-tetrahydroxy-etiocholanic acid.*—About 0.12 gram of the acid

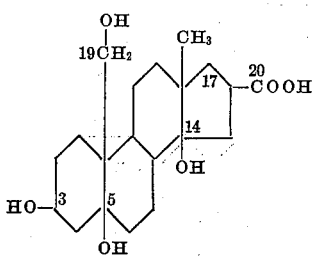

was dissolved in 14 cc. of acetone, with heating under reflux condenser, and the solution was concentrated to about two-thirds of this volume on the water bath. To this solution was added at 0° C. the amount of an ethereal solution of diazomethane sufficient to produce a persistent yellow color. After brief standing at room temperature, the excess of diazomethane was evaporated off over a water bath and the solution then brought to dryness under vacuum (at 40–45° C.). The residue was a brittle foam which was transferred into a separatory funnel by means of a total of 40 cc. of ether. The ether solution was washed successively with 3 cc. of normal hydrochloric acid, 3 cc. of water, 3 cc. of a 5% sodium carbonate solution, and three times with 3 cc. each of water. After drying with sodium sulfate, the solution was filtered and brought to dryness, the final drying being under vacuum. The residue was a colorless resin which became almost completely crystalline after a few days standing in a vacuum desiccator. Yield: 0.091 gram. This material was recrystallized by dissolving it in acetone and slowly adding at room temperature some petroleum ether. The separation of spear-shaped crystals began very soon. The crystalline methyl ester of 3,5,14,19-tetrahydroxy-etiocholanic acid, whose structural formula is:

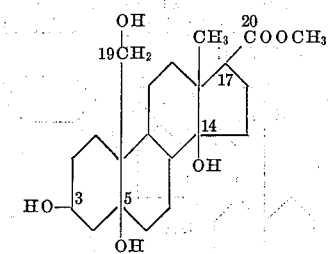

was filtered on the following day. Yield 0.053 gram, melting at 168–169° C. More crystalline ester was secured from the mother liquor.

*Example II.—Ethyl ester of 3,5,14,19-tetrahydroxy-etiocholanic acid.*—To obtain the ethyl ester instead of the methyl ester of Example I, the starting acid of Example I is employed, and diazoethane is used instead of diazomethane. From this is obtained the ethyl ester of 3,5,14,19-tetrahydroxy-etiocholanic acid having the structure, and melting at 186–188.5° C.:

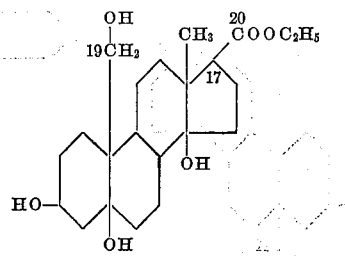

*Example III.—Propyl ester of 3,5,14,19-tetra-hydroxy-etiocholanic acid.*—To obtain the propyl ester instead of the methyl ester of Example I, the starting acid of Example I is employed, and diazopropane is used instead of diazomethane. From this is obtained the propyl ester of 3,5,14,19-tetrahydroxy-etiocholanic acid having the structure:

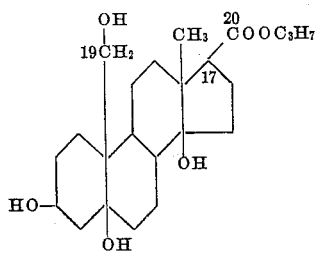

*Example IV.—Butyl ester of 3,5,14,19-tetrahydroxy-etiocholanic acid.*—To obtain the butyl ester instead of the methyl ester of Example I, the starting acid of Example I is employed, and diazobutane is used instead of diazomethane. From this is obtained the butyl ester of 3,5,14,19-tetrahydroxy-etiocholanic acid having the structure:

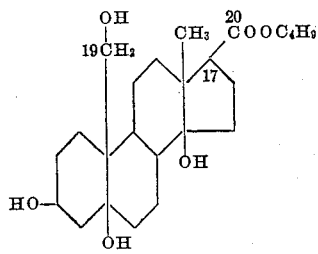

*Example V.—Phenyl ester of 3,5,14,19-tetrahydroxy-etiocholanic acid.*—To obtain the phenyl ester instead of the methyl ester of Example I, the starting acid of Example I is employed, and phenyl diazonium chloride is used instead of diazomethane. From this is obtained the phenyl ester of 3,5,14,19-tetrahydroxy-etiocholanic acid having the structure:

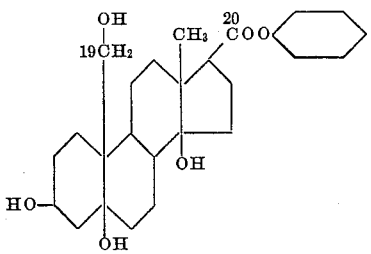

*Example VI. Benzyl ester of 3,5,14,19-tetrahydroxy-etiocholanic acid.*—To obtain the benzyl ester instead of the methyl ester of Example I, the starting acid of Example I is employed, and benzyl diazonium chloride is used instead of diazomethane. From this is obtained the benzyl ester of 3,5,14,19-tetrahydroxy-etiocholanic acid having the structure:

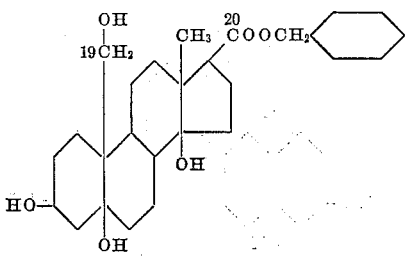

It will be understood that to obtain the esters of Examples I to VI, it is also possible to carry out an esterification reaction between the acid starting material of Example I and the selected alcohol, for instance, as methanol, ethanol, or benzyl alcohol, in the presence of a mineral acid.

*Example VII.—Methyl ester of 3,5,14,19-tetrahydroxy - etiocholanic acid 3,19 - diacetate.*—As starting material, the diacetate having the following structure was used:

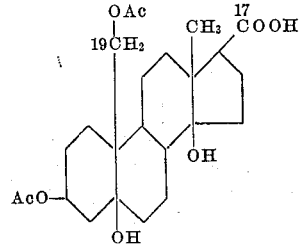

To this, in an ethereal solution, was added diazomethane in the manner described in Example I. The reaction product was isolated as set forth in that example. This was the methyl ester of 3,5,14,19-tetrahydroxy-etiocholanic acid 3,19-diacetate, having the structure:

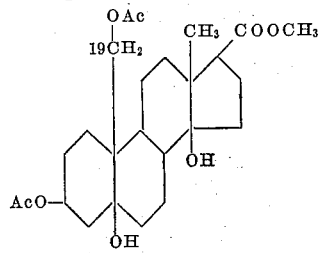

*Example VIII.—Ethyl ester of 3,5,14,19-tetrahydroxy-etiocholanic acid 3,19-diacetate.*—To obtain the ethyl ester instead of the methyl ester of Example VII, the starting diacetate of Example VII is employed and diazoethane is used instead of diazomethane. From this is obtained the ethyl ester of 3,5,14,19-tetrahydroxy-etiocholanic acid 3,19-diacetate having the following structure:

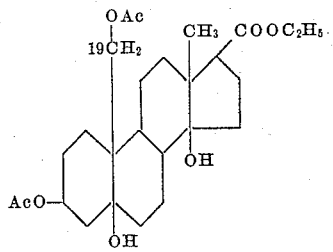

*Example IX.—Propyl ester of 3,5,14,19-tetrahydroxy-etiocholanic acid 3,19-diacetate.*—To obtain the propyl ester instead of the methyl ester of Example VII, the starting diacetate of Example VII is employed and diazopropane instead of diazomethane is used. From this is obtained the propyl ester of 3,5,14,19-tetrahydroxy-etiocholanic acid 3,19-diacetate having the following structure:

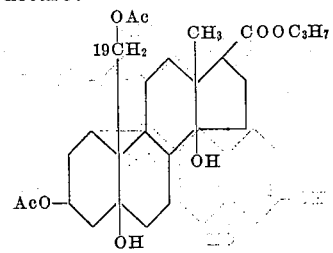

*Example X.—Butyl ester of 3,5,14,19-tetrahydroxy-etiocholanic acid 3,19-diacetate.*—To obtain the butyl ester instead of the methyl ester of Example VII, the starting diacetate of Example VII is employed and diazobutane is used instead of diazomethane. From this is obtained the butyl ester of 3,5,14,19-tetrahydroxy-etiocholanic acid 3,19-diacetate having the following structure:

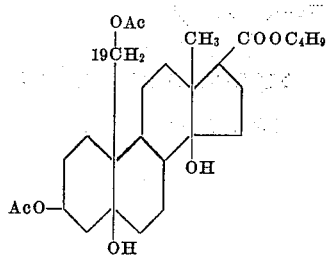

*Example XI.—Phenyl ester of 3,5,14,19-tetrahydroxy-etiocholanic acid 3,19-diacetate.*—To obtain the phenyl ester instead of the methyl ester of Example VII, the diacetate of Example VII is employed, and phenyl diazonium chloride is used instead of diazomethane. From this is obtained the phenyl ester of 3,5,14,19-tetrahydroxy-etiocholanic acid 3,19-diacetate having the structure:

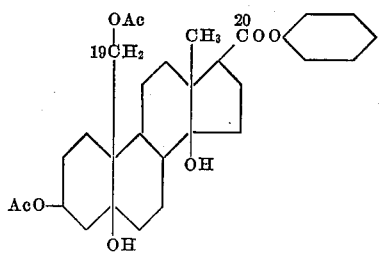

*Example XII.—Benzyl ester of 3,5,14,19-tetrahydroxy-etiocholanic acid 3,19-diacetate.*—To obtain the benzyl ester instead of the methyl ester of Example VII, the diacetate of Example VII is employed, and benzyl diazonium chloride is used instead of diazomethane. From this is obtained the benzyl ester of 3,5,14,19-tetrahydroxy-etiocholanic acid 3,19-diacetate having the structure:

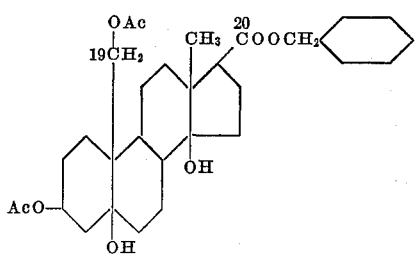

It will be understood that to obtain the esters of Examples VII to XII, it is also possible to carry out an esterification reaction between the diacetate starting material of Example VII and the selected alcohol as, for instance, methanol, ethanol or benzyl alcohol, in the presence of a mineral acid.

In Examples VII to XII, the 3,19-diacetate has been shown. Instead of the diacetate this may be other diacyl compounds, as is clear from my application Serial No. 666,191. Thus the ester radicals at the 3 and 19 positions may be obtained from lower alkyl monohydric acids containing no other substituent groups, as well as benzylic acid and benzoic acid. Examples of such other diacyl compounds will be clear from the diacetate compounds of Examples VII to XII, and therefore are not specifically illustrated.

The term "ester" used in the specification and claims is used in its commonly accepted sense as restricted to an ester resulting from the use of a carboxylic acid. It is in that common, restricted sense that the term "acyl" is also used.

The products obtained by the process described in the Examples VII to XII are also obtainable by acylating the corresponding product of the hydroxy type produced according to Examples I and VI in the same manner disclosed in Serial No. 666,191.

It will be understood, with reference to the several compounds illustrated and described above, that I do not intend that this invention or the claims appended hereto shall be limited to any particular stereo-chemical configuration about any carbon atom and, in particular, about carbon atoms 3, 5, 10, 14 and 17.

What I claim is:

1. A 3,5,14,19-tetrahydroxy-etiocholanic acid compound of the general formula

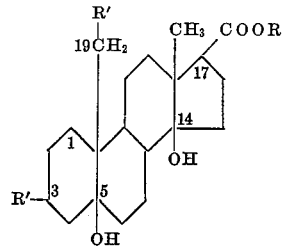

in which R' is selected from the group consisting of —OH and acyloxy derived from lower alkyl monohydric acids containing no other substituent groups, and R is selected from the group consisting of lower alkyl, phenyl and benzyl radicals.

2. A 3,5,14,19-tetrahydroxy-etiocholanic acid compound of the general formula

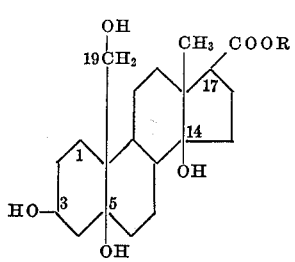

in which R is selected from the group consisting of lower alkyl, phenyl and benzyl radicals.

3. A 3,5,14,19-tetrahydroxy-etiocholanic acid compound of the general formula

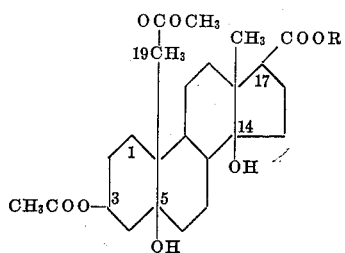

in which R is selected from the group consisting of lower alkyl, phenyl and benzyl radicals.

4. 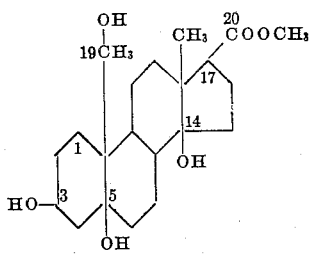
5. 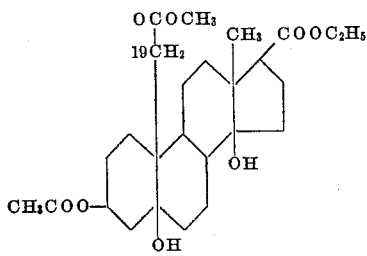
6. 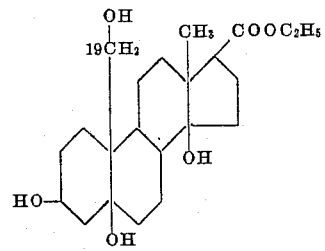
MAXIMILIAN R. EHRENSTEIN.
No references cited.

Certificate of Correction

Patent No. 2,558,549                                                     June 26, 1951

MAXIMILIAN R. EHRENSTEIN

It is hereby certified that error appears in the printed specification of the above numbered patent requiring correction as follows:

Column 6, line 12, for "and VI" read *to VI*; line 18, for "stero-chemical" read *stereo-chemical*; column 6, claim 3, for that portion of the formula reading

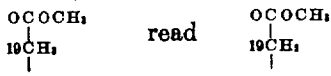

column 7, claim 4, for that portion of the formula reading

and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*